US012317036B2

(12) United States Patent
De Vries et al.

(10) Patent No.: US 12,317,036 B2
(45) Date of Patent: May 27, 2025

(54) HEARING DEVICE WITH ADAPTIVE PINNA RESTORATION

(71) Applicant: GN Hearing A/S, Ballerup (DK)

(72) Inventors: Rob Anton Jurjen De Vries, Tilburg (NL); Jesper Bünsow Boldt, Ballerup (DK); Erik Cornelis Diederik Van Der Werf, Eindhoven (NL)

(73) Assignee: GN Hearing A/S, Ballerup (DK)

( * ) Notice: Subject to any disclaimer, the term of this patent is extended or adjusted under 35 U.S.C. 154(b) by 0 days.

(21) Appl. No.: 17/890,576

(22) Filed: Aug. 18, 2022

(65) Prior Publication Data

US 2023/0171553 A1 Jun. 1, 2023

(30) Foreign Application Priority Data

Nov. 29, 2021 (DK) ........................... PA 2021 70587

(51) Int. Cl.
*H04R 25/00* (2006.01)

(52) U.S. Cl.
CPC ........... *H04R 25/407* (2013.01); *H04R 25/55* (2013.01); *H04R 2225/021* (2013.01)

(58) Field of Classification Search
CPC ...... H04R 25/407; H04R 25/55; H04R 25/40; H04R 25/405; H04R 25/43; H04R 2225/021; H04R 2225/0216
USPC ........................................ 381/313, 312, 330
See application file for complete search history.

(56) References Cited

U.S. PATENT DOCUMENTS

2006/0013409 A1 1/2006 Desloge et al.
2014/0185846 A1* 7/2014 Gran .................... H04R 25/407 381/313
2014/0185849 A1 7/2014 Ma et al.
2014/0348360 A1* 11/2014 Gran ...................... H04R 25/50 381/318

(Continued)

FOREIGN PATENT DOCUMENTS

EP 2 088 802 A1 8/2009
EP 3 496 423 A1 6/2019
EP 3 506 658 A1 7/2019

OTHER PUBLICATIONS

Foreign OA for CN Patent Appln. No. 202211260088.1 dated Feb. 9, 2024.

(Continued)

*Primary Examiner* — Ahmad F. Matar
*Assistant Examiner* — Sabrina Diaz
(74) *Attorney, Agent, or Firm* — Vista IP Law Group, LLP

(57) ABSTRACT

A hearing device includes: a pinna restorer for provision of a pinna output based on a first pinna input and a second pinna input, wherein the first pinna input is based on a primary first microphone input signal, and wherein the second pinna input is based on a primary second microphone input signal, the pinna restorer comprising: a first filter for provision of a first mixer input based on the first pinna input, a second filter for provision of a second mixer input based on the second pinna input, a first mixer for provision of a first mixer output based on the first mixer input and the second mixer input, and a pinna controller; and an input mixer for provision of an input mixer output based on the pinna output and a secondary mixer input, wherein the secondary mixer input is based on a secondary microphone input signal.

18 Claims, 6 Drawing Sheets

(56) References Cited

U.S. PATENT DOCUMENTS

| | | | |
|---|---|---|---|
| 2021/0345041 | A1 | 11/2021 | Boldt et al. |
| 2021/0345042 | A1 | 11/2021 | Boldt et al. |

OTHER PUBLICATIONS

1st Technical Examination for Danish Patent Appln. No. PA 2021 70587 dated Feb. 28, 2022.

* cited by examiner

HEARING DEVICE WITH ADAPTIVE PINNA RESTORATION

RELATED APPLICATION DATA

This application claims priority to, and the benefit of, Danish Patent Application No. PA 2021 70587 filed on Nov. 29, 2021. The entire disclosure of the above application is expressly incorporated by reference herein.

FIELD

The present disclosure relates to a hearing device and related methods including a method of operating a hearing device. In particular, a hearing device with both an in-ear microphone and one or more behind-the-ear microphones and related method are disclosed.

BACKGROUND

For hearing device designers, spatial perception and the ability to perceive spatial cues play an important role in a hearing device user's ability to understand speech and crucial for complex listening environments. On the other hand, feedback and instabilities in hearing aids continue to represent challenges to hearing device designers and engineers in particular when microphones and receiver are placed near each other, for example in a MaRie (Microphone and Receiver in ear) hearing device.

SUMMARY

Accordingly, there is a need for hearing devices and methods with improved spatial perception and stability of the hearing device.

A hearing device is disclosed, the hearing device comprising a first housing optionally configured as a behind-the-ear housing to be worn behind the pinna of a user; a second housing optionally configured as an earpiece housing to be worn in or at the ear canal of a user; and a wire connecting the first housing and the second housing. The hearing device comprises a primary set of microphones arranged in the first housing, the primary set of microphones including a primary first microphone for provision of a primary first microphone input signal, and optionally a primary second microphone for provision of a primary second microphone input signal; optionally a secondary microphone arranged in the second housing for provision of a secondary microphone input signal; and a pinna restorer for provision of a pinna output based on a first pinna input and a second pinna input, wherein the first pinna input is based on the primary first microphone input signal and the second pinna input is based on the primary second microphone input signal. The pinna restorer comprises a first filter for provision of a first mixer input based on the first pinna input, a second filter for provision of a second mixer input based on the second pinna input, and a first mixer for provision of a first mixer output based on the first mixer input and the second mixer input. The hearing device comprises an input mixer for provision of an input mixer output based on the pinna output and/or a secondary mixer input, wherein the secondary mixer input is based on the secondary microphone input signal; a processor for processing the input mixer output and providing an electrical output signal based on the input mixer output; and a receiver for converting the electrical output signal to an audio output signal. The pinna restorer optionally comprises a pinna controller. The first mixer optionally comprises a first pinna filter for filtering the first mixer input and/or a second pinna filter for filtering the second mixer input. The pinna controller may be configured to control one or both of the first pinna filter and the second pinna filter, e.g. based on the secondary mixer input. The pinna restorer optionally comprises a third pinna filter for provision of a first pinna output based on the first mixer output from the first mixer, and wherein the pinna output is based on the first pinna output.

Further, a method of operating a hearing device is disclosed, the hearing device comprising a first housing configured as a behind-the-ear housing to be worn behind the pinna of a user; a second housing configured as an earpiece housing to be worn in or at the ear canal of a user; a wire connecting the first housing and the second housing; a primary set of microphones arranged in the first housing, the primary set of microphones including a primary first microphone and/or a primary second microphone; a secondary microphone arranged in the second housing; a pinna restorer, an input mixer; a processor; and a receiver, the method comprising: obtaining a primary first microphone input signal with the primary first microphone; obtaining a primary second microphone input signal with the primary second microphone; obtaining a secondary microphone input signal with the secondary microphone; providing a pinna output based on a first pinna input and/or a second pinna input, wherein the first pinna input is optionally based on the primary first microphone input signal and the second pinna input is optionally based on the primary second microphone input signal. Providing a pinna output comprises providing a first mixer input based on the first pinna input, providing a second mixer input based on the second pinna input, and providing a first mixer output based on the first mixer input and the second mixer input. The method comprises providing an input mixer output based on the pinna output and a secondary mixer input, wherein the secondary mixer input is optionally based on the secondary microphone input signal; processing the input mixer output for provision of an electrical output signal; and converting the electrical output signal to an audio output signal. In the method, providing a pinna output optionally comprises controlling one or both of a first pinna filter and a second pinna filter of the pinna restorer, e.g. based on the secondary mixer input, and filtering the first mixer output for provision of a first pinna output, and wherein the pinna output is based on the first pinna output.

It is an important advantage of the hearing device that improved spatial perception in a hearing device with a more personalized Head Related Transfer Function (HRTF) and increased stability is provided. Accordingly, the risk of feedback in the hearing device is reduced while spatial cues are preserved to a higher degree, which in turn provides an improved hearing device.

Further, the present disclosure provides improved user experience by improving speech intelligibility and reducing feedback.

It is an advantage of the present disclosure that the hearing device does not require initialization. Further, adaptive mixing provides an optimized balance between Microphone-In-Ear (MIE) and pinna restoration in many if not all situations, in turn increasing performance over the current fixed MIE blending.

Also, the present disclosure presents a hearing device with improved robustness due to the adaptive MIE mixing (it is self-stabilizing) and therefore is likely to increase stable gain, fits well with current system design, and reduces variance between subjects (adaptive signal matching makes the mixing behavior more consistent).

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
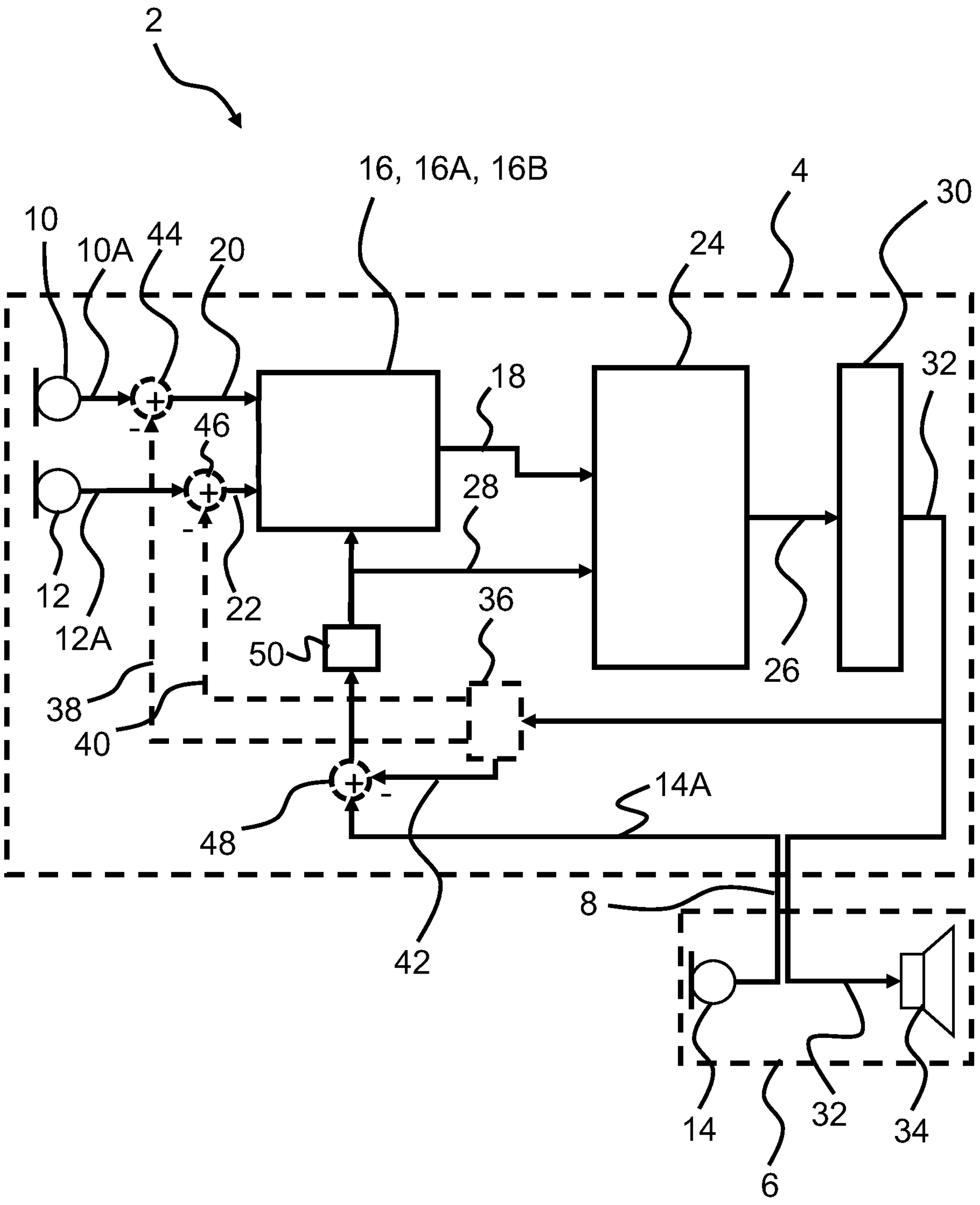
FIG. 1 schematically illustrates an exemplary hearing device.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user and may be a hearable or a hearing aid, wherein the processor is configured to compensate for a hearing loss of a user.

The hearing device may be of the Microphone-and-Receiver-in ear (MaRIE) type. The hearing device may be a combined BTE and MaRIE type hearing device. The hearing device may be part of a binaural hearing system. Thus, the hearing device may be a binaural hearing device.

The hearing device comprises a first housing optionally configured as a behind-the-ear housing to be worn behind the pinna of a user and a second housing optionally configured as an earpiece housing to be worn in and/or at the ear canal of a user.

The hearing device comprises a wire connecting the first housing and the second housing. The wire comprises a plurality of conductors, e.g. three, four, five, six, or even eight or more conductors for electrically connecting electrical components of the first housing to electrical components of the second housing.

The hearing device comprises a primary set of microphones arranged in the first housing, the primary set of microphones including a primary first microphone for provision of a primary first microphone input signal also denoted x_1_1, and optionally a primary second microphone for provision of a primary second microphone input signal also denoted x_1_2. The primary first microphone may be denoted a front BTE (behind-the-ear) microphone and the primary second microphone may be denoted a rear BTE (behind-the-ear) microphone. The primary set of microphones may comprise a primary third microphone for provision of a primary third microphone input signal also denoted x_1_3.

The hearing device comprises a secondary microphone, also denoted secondary first microphone, arranged in the second housing for provision of a secondary microphone input signal also denoted x_2 or x_2_1. The secondary microphone may be denoted an in-ear microphone. The hearing device may comprise a plurality of secondary microphones arranged in the second housing. For example, a secondary second microphone, also denoted a canal microphone, may be arranged in the second housing for receiving intra-canal sounds in order to reduce occlusion effects.

The hearing device comprises a pinna restorer for provision of a pinna output based on a first pinna input and a second pinna input. The first pinna input is based on the primary first microphone input signal. For example, the primary first microphone input signal may be fed directly as the first pinna input or the primary first microphone input signal may be subject for feedback cancellation, e.g. with a primary first feedback canceller, and the feedback-cancelled primary first microphone input signal may be fed to the pinna restorer as the first pinna input. The second pinna input is based on the primary second microphone input signal. For example, the primary second microphone input signal may be fed directly as the second pinna input or the primary second microphone input signal may be subject for feedback cancellation, e.g. with a primary second feedback canceller, and the feedback-cancelled primary second microphone input signal may be fed to the pinna restorer as the second pinna input.

The pinna restorer optionally comprises a first filter for provision of a first mixer input based on the first pinna input, and a second filter for provision of a second mixer input based on the second pinna input. The first filter and/or the second filter may be constant filters and are optionally configured to adjust the respective first and second pinna inputs for optimal presentation to the subsequent first mixer of the pinna restorer. Adjustments may include one or more of calibration offsets, compensation for microphone location effects, signal alignment, microphone matching, and even an entire fixed directional pattern (e.g., encoding the channel responses for a non-adaptive MaRIE solution). In one or more exemplary hearing devices, the first pinna input may be provided as the first mixer input and/or the second pinna input may be provided as the second mixer, i.e. the first filter and/or the second filter may be omitted.

The pinna restorer comprises a first mixer for provision of a first mixer output based on the first mixer input and the second mixer input. The pinna output is based on the first mixer output. In one or more exemplary hearing devices/pinna restorers, the first mixer output forms the pinna output.

The pinna restorer may be a multi-channel pinna restorer. In other words, the first filter and/or the second filter of the pinna restorer may be a multichannel filter, such as a filterbank. The first mixer may be multi-channel mixer.

The hearing device comprises an input mixer for provision of an input mixer output based on the pinna output and a secondary mixer input. The secondary mixer input is based on the secondary microphone input signal. For example, the secondary microphone input signal may be fed directly as the secondary mixer input. In one or more example hearing devices, the secondary microphone input signal may be subject to feedback cancellation and/or filtering, e.g. with a secondary feedback canceller and/or a secondary filter, and the feedback-cancelled and/or filtered secondary microphone input signal may be fed to the pinna restorer as the secondary mixer input. The secondary filter may be a constant filter and is optionally configured to adjust the secondary microphone input signal or the feedback-cancelled secondary microphone input signal for optimal presentation to the subsequent input mixer. Adjustments may include one or more of calibration offsets, compensation for microphone location effects, signal alignment, microphone matching, and even an entire fixed directional pattern (e.g., encoding the channel responses for a non-adaptive MaRIE solution).

The hearing device comprises a processor for processing the input mixer output and providing an electrical output signal based on the input mixer output; and a receiver for converting the electrical output signal to an audio output signal. The processor may be configured to compensate for hearing loss of the user of the hearing device.

In one or more exemplary hearing devices, the pinna restorer comprises a pinna controller, and the first mixer comprising one or more of a first pinna filter for filtering the first mixer input and a second pinna filter for filtering the second mixer input. The pinna controller is optionally configured to control one or both of the first pinna filter and the second pinna filter, e.g. based on the secondary mixer input. In other words, the secondary mixer input, which closely approximates the personal pinna response can be used to adapt the first pinna filter and/or the second pinna filter. Thus, the first pinna filter may be an adaptive filter and/or the second pinna filter may be an adaptive filter. The first mixer comprises a first input adder adding the filtered first mixer input and the filtered the second mixer input.

The pinna restorer may comprise a third pinna filter for provision of a first pinna output based on the first mixer output from the first mixer. In other words, the first mixer output may be fed to a third pinna filter and filtered with the third pinna filter, the filtered first mixer output forming the first pinna output. The third pinna filter may be an adaptive filter. Thereby, direction independent adjustments can be done efficiently by adapting the third pinna filter. The pinna output may be based on the first pinna output. For example, the first pinna output may form or constitute the pinna output.

The pinna restorer may be an adaptive pinna restorer. In other words, the pinna restorer may comprise one or more adaptive pinna filters.

In one or more example hearing devices, to control one or both of the first pinna filter and the second pinna filter based on the secondary mixer input comprises determining a first pinna control signal, wherein determining a first pinna control signal optionally comprises applying a first delay to the secondary mixer input. The first pinna control signal is optionally fed to the first pinna filter being an adaptive filter for adapting the filter coefficients of the first pinna filter, e.g. based on the first pinna control signal. The first pinna control signal is optionally fed to the second pinna filter being an adaptive filter for adapting the filter coefficients of the second pinna filter, e.g. based on the first pinna control signal.

The first delay may be in the range from 0.1 ms to 3 ms. In one or more example hearing devices, the first delay is the range from 0.2 ms to 1.5 ms. The first delay may be less than 1.2 ms, such as in the range from 0.3 ms to 1.0 ms.

In one or more example hearing devices, to control the second pinna filter based on the secondary mixer input comprises determining a second pinna control signal, wherein determining a second pinna control signal optionally comprises applying a second delay to the secondary mixer input. The second pinna control signal is optionally fed to the second pinna filter being an adaptive filter for adapting the filter coefficients of the second pinna filter, e.g. based on the second pinna control signal.

In one or more example hearing devices, to control one or both of the first pinna filter and the second pinna filter is based on the first mixer output. In other words, the first pinna control signal and/or the second pinna control signal may be based on the first mixer output FMO. The first pinna control signal may be based on the secondary mixer input. In one or more exemplary hearing devices, the first pinna control signal PCS_1 is given by:

$$PCS\_1 = \mathrm{DSMI\_1} - FMO,$$

where DSMI_1 is the secondary microphone input with a first delay D1 and FMO is the first mixer output.

In one or more example hearing devices, the pinna controller is configured to control the third pinna filter based on the secondary mixer input.

In one or more example hearing devices, to control the third pinna filter based on the secondary mixer input comprises determining a third pinna control signal, wherein determining a third pinna control signal optionally comprises applying a third delay to the secondary mixer input.

The third delay may be less than 15 ms. In one or more example hearing devices, the third delay is in the range from 0.1 ms to 3 ms, such as in the range from 0.2 ms to 1.5 ms. The third delay may be less than 1.2 ms, such as in the range from 0.3 ms to 1.0 ms.

In one or more example hearing devices, the third delay is larger or longer than the first delay. A difference between the third delay and the first delay may be at least 0.1 ms, such as in the range from 0.1 ms to 1.2 ms. In one or more example hearing devices, the difference between the third delay and the first delay is 0.2 ms, 0.3 ms, 0.4 ms, 0.5 ms, 0.6 ms, 0.7 ms, 0.8 ms, 0.9 ms, or 1.0 ms.

In one more exemplary hearing devices, the first delay matches the processing delay of the first pinna filter. In one more exemplary hearing devices, the third delay matches the sum of processing delays of the first pinna filter, the adder of first mixer, and third pinna filter.

In one or more example hearing devices, to control the third pinna filter is based on the first pinna output. For example, a third pinna control signal from the pinna controller to the the third pinna filter may be based on the first pinna output being the output of the third pinna filter. The third pinna control signal from the pinna controller to the third pinna filter may be based on the secondary mixer input optionally delayed with a third delay in third delay unit. Thus, the third pinna control signal is optionally fed to the third pinna filter being an adaptive filter for adapting the filter coefficients of the third pinna filter, e.g. based on the third pinna control signal. In other words, the third pinna control signal may be based on the first pinna output FPO. The third pinna control signal may be based on the secondary mixer input. In one or more exemplary hearing devices, the third pinna control signal PCS_3 is given by:

$$PCS\_3 = \mathrm{DSMI\_3} - FPO,$$

where DSMI_3 is the secondary microphone input with a third delay D3 and FPO is the first pinna output.

In one or more example hearing devices, the hearing device comprises a feedback cancellation system configured to apply feedback cancellation to one or more of the primary first microphone input signal, the primary second microphone input signal, and the secondary microphone input signal. The feedback cancellation system may comprise a feedback cancellation module for provision of one or more feedback cancellation signals including one or more of a primary first feedback cancellation signal for the primary first microphone input signal, a primary second feedback cancellation signal for the primary second microphone input signal, and a secondary feedback cancellation signal for the secondary microphone input signal. The feedback cancellation system may comprise one or more of a primary first feedback canceller, a primary second feedback canceller, and a secondary feedback canceller depending on the selected feedback cancellation configuration. The feedback cancellation signals are fed to the primary first feedback canceller for feedback cancellation of the primary first microphone input signal, primary second feedback canceller for feedback cancellation of the primary second microphone input signal, and secondary feedback canceller for feedback cancellation of the secondary microphone input signal, respectively. In one or more exemplary hearing devices, feedback cancellation is only applied to the secondary microphone input signal.

In one or more example hearing devices, the input mixer comprises a first input adder for provision of the input mixer output based on a first main input and a second main input. The first main input may be based on the pinna output and the second main input may be based on the secondary mixer input. The input mixer output may be given as the sum or a linear combination of the first main input and a second main input.

In one or more example hearing devices, the input mixer comprises a first input filter for provision of the first main input based on a first output of the first input filter.

In one or more example hearing devices, the input mixer comprises a second input filter for provision of the second main input based on a second output of the second input filter. Optionally, the second input filter receives the secondary mixer input and filters the secondary mixer input for provision of a second output of the second input filter. The second input filter may be a fixed filter or an adaptive filter. The second output of the second input filter may be used as or form the second main input.

In one or more example hearing devices, the input mixer comprises a second input adder for provision of a second adder output based on the pinna output and/or the second output of the second input filter. The second adder output may be given as the difference between the pinna output and the second output of the second input filter. The second adder output may be fed to the second input filter as a control signal for adaptation. The second adder output may be an input to the first input filter, i.e. the first input filter may filter the second adder output for forming the first output/first main input.

In one or more example hearing devices, the input mixer comprises a third input filter for provision of the second main input based on the second output of the second input filter. Thus, the second main input may be based on the secondary mixer input. The third input filter may filter the second output of the second input filter and provide the second main input as third output of the third input filter, i.e. the third input filter may filter the second output for forming the third output/second main input. The third input filter may be a fixed filter or an adaptive filter. In one or more example hearing devices, the third input filter is an all-pass filter.

In one or more example hearing devices, the input mixer is configured to control the first input filter based on the input mixer output. In other words, the input mixer output may be fed to the first input filter as a control signal.

In one or more example hearing devices, the input mixer is configured to control the second input filter based on the pinna input and/or the second output of the second input filter, e.g. a difference between the pinna input and the second output of the second input filter. In other words, the first adder outputl, e.g. based on the pinna input and/or the second output, may be fed to the second input filter as a control signal for adaptation of the second input filter.

The hearing device/pinna restorer performs Pinna Restoration (PR) and uses the BTE microphone input signals (front such as primary first microphone input signal, rear such as primary second microphone input signal) to approximate the pinna response. The calibrated MIE signal $x_m$, herein also denoted the secondary mixer input, which closely approximates the personal pinna response, can be used to adapt PR. Adjustments in the directional pattern are possible by adapting the first pinna filter, also denoted $W_f$, and/or the second pinna filter, also denoted $W_r$, (e.g by minimizing the first pinna control signal also denoted $e_1$). Direction independent adjustments can be done efficiently by adapting the third pinna filter also denoted $W_p$ (e.g. by minimizing the third pinna control signal also denoted $e_3$). In the pinna restorer, first delay unit optionally configurable with first delay $D_1$ and third delay unit optionally configurable with third delay $D_3$ may facilitate optimal time alignment for the adaptive pinna filters.

In one or more example hearing devices, the secondary mixer input (MIE signal $x_m$) is matched to the pinna output (PO) in the input mixer by second input filter, also denoted $W_m$. The MIE matching may be done by an adaptive filter, e.g. by minimizing the second adder output, see e.g. FIG. 3. In other words, the second input filter may be an adaptive filter.

In one or more example hearing devices, the secondary mixer input (MIE signal $x_m$) is matched to the pinna output (PO) in the input mixer by the second input filter being a fixed filter, e.g. where the second input filter has been matched to the delay(s), such as the third delay D3 applied in the pinna restorer.

Under normal circumstances (when PR is stable), feedback on the pinna output is smaller than feedback on the MIE channel (secondary mixer input). Adapting the MIE channel towards PR thus has a built-in tendency to reduce feedback, and can be considered self-stabilizing.

In one or more example hearing devices, the input mixer takes the matched signals from the secondary mixer input (second output from second input filter) and the pinna restorer (pinna output) and calculates a mixture of the two. The channels may be phase aligned and effective gains sum to 1 (otherwise feedback could be minimized simply by muting both channels) in order to avoid degenerate solutions.

Figure 3:
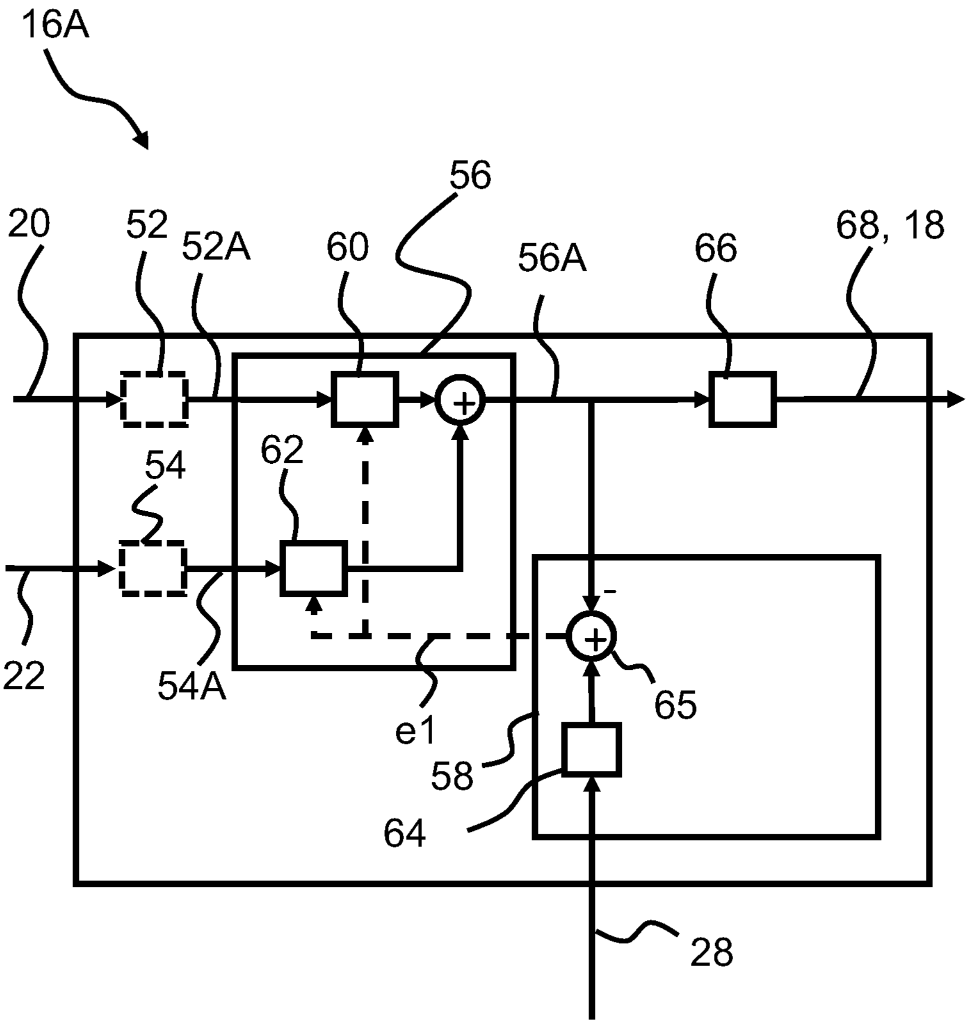

In one or more example input mixers, the input mixer output IMO, see also FIG. 3, is given by:

$$IMO=IF3(SO)+IF1(PO-SO),$$

where IF3 is the filter function of the third input filter (optionally an all-pass filter), SO is the second output from the second input filter applying the filter function IF2 to the secondary mixer input SMI, IF1 is the filter function of the first input filter (optionally adaptive, e.g. with a phase response that matches the third input filter), and PO is the pinna output. IF1(PO-SO) is also denoted the second adder output.

The second output SO of the second input filter may be given as:

$$SO=IF2(SMI),$$

where IF2 is the, optionally adaptive, filter function of the second input filter and SMI is the secondary mixer input.

The first input filter of the input mixer may be implemented by an odd-length linear phase FIR filter but other forms such as a warped FIR filter are also possible. The first input filter of the input mixer being implemented by an odd-length linear phase FIR filter implies that the third input filter becomes an integer number of samples delay. The first input filter of the input mixer may be a frequency-dependent filter, e.g. such that different frequencies may get a different mixing of SO and PI.

In one or more example input mixers, non-adaptive mixing may be used, however adaptive mixing in the input mixer can compensate for changes in the feedback paths and therefore may provide superior performance.

In one or more example input mixers where the first input filter is adaptive, the first input filter minimizes the power of the input mixer output IMO using a standard LMS update. When feedback distortion dominates (power SO>PI) the first input filter automatically adapts toward the pinna input PI. On the other hand if, for example, distortion from microphone noise or wind noise dominates the BTE channels (power SO<PI) the first input filter adapts toward the second output that is based on the secondary microphone input signal. In situations where no obvious benefit is directly apparent, unbiased adaptation of the first input filter would likely adapt to a 50/50 mixing result, which provides 3 dB reduction for uncorrelated noises.

A method of operating a hearing device, such as a method disclosed herein, is disclosed. The hearing device comprises a first housing optionally configured as a behind-the-ear housing to be worn behind the pinna of a user; a second housing optionally configured as an earpiece housing to be worn in or at the ear canal of a user; a wire connecting the first housing and the second housing; a primary set of microphones arranged in the first housing, the primary set of microphones including a primary first microphone and a primary second microphone; a secondary microphone arranged in the second housing; a pinna restorer, an input mixer; a processor; and a receiver. The method comprises obtaining a primary first microphone input signal with the primary first microphone; obtaining a primary second microphone input signal with the primary second microphone; obtaining a secondary microphone input signal with the secondary microphone; and providing a pinna output based on a first pinna input and/or a second pinna input. The first pinna input is based on the primary first microphone input signal and the second pinna input is based on the primary second microphone input signal, wherein providing a pinna output comprises providing a first mixer input based on the first pinna input, providing a second mixer input based on the second pinna input, and providing a first mixer output based on the first mixer input and the second mixer input. The method comprises providing an input mixer output based on the pinna output and a secondary mixer input, wherein the secondary mixer input is based on the secondary microphone input signal; processing the input mixer output for provision of an electrical output signal; and converting the electrical output signal to an audio output signal. In the method, providing a pinna output optionally comprises controlling one or both of a first pinna filter and a second pinna filter of the pinna restorer based on the secondary mixer input, and optionally filtering the first mixer output for provision of a first pinna output, and wherein the pinna output is based on the first pinna output. The first mixer output may be used as, e.g. constitute the first pinna output.

It is to be noted that features described in relation to the hearing device are also applicable to the method and vice versa.

In one or more exemplary hearing devices, the first pinna filter may be fixed or frozen, e.g. in accordance with a control signal from the pinna controller. In other words, the pinna controller may be configured to activate and/or deactivate adaptation in the first pinna filter. In one or more exemplary hearing devices, the pinna controller may be configured to freeze the first pinna filter, e.g. in accordance with a determination that the first pinna filter has converged to a satisfactory level, such as in accordance with a convergence parameter satisfying (e.g. larger than or smaller than) a convergence threshold.

In one or more exemplary hearing devices, the second pinna filter may be fixed or frozen, e.g. in accordance with a control signal from the pinna controller. In other words, the pinna controller may be configured to activate and/or deactivate adaptation in the second pinna filter. In one or more exemplary hearing devices, the pinna controller may be configured to freeze the second pinna filter, e.g. in accordance with a determination that the second pinna filter has converged to a satisfactory level, such as in accordance with a convergence parameter satisfying (e.g. larger than or smaller than) a convergence threshold.

In one or more exemplary hearing devices, the third pinna filter may be fixed or frozen, e.g. in accordance with a control signal from the pinna controller. In other words, the pinna controller may be configured to activate and/or deactivate adaptation in the third pinna filter. In one or more exemplary hearing devices, the pinna controller may be configured to freeze the third pinna filter, e.g. in accordance with a determination that the third pinna filter has converged to a satisfactory level, such as in accordance with a convergence parameter satisfying (e.g. larger than or smaller than) a convergence threshold.

In one or more exemplary hearing devices, the first input filter may be fixed or frozen, e.g. in accordance with a control signal. In other words, the hearing device may be configured to activate and/or deactivate adaptation in the first input filter. In one or more exemplary hearing devices, the pinna controller may be configured to freeze the first input filter, e.g. in accordance with a determination that the first input filter has converged to a satisfactory level, such as in accordance with a convergence parameter satisfying (e.g. larger than or smaller than) a convergence threshold.

Thus, the pinna controller may be configured to selectively adapt and/or freeze one or more of the first pinna filter, the second pinna filter, the third pinna filter, and the first input filter. In one or more exemplary hearing devices, the first pinna filter and the second pinna filter may be adapted while the third filter is frozen. In one or more exemplary hearing devices, the first pinna filter and the second pinna filter may be frozen while the third filter is adapted, e.g. in a fitting situation or other controlled environment.

FIG. 1 shows exemplary hearing devices. The hearing device 2 comprises a first housing 4 configured as a behind-the-ear housing to be worn behind the pinna of a user; a second housing 6 configured as an earpiece housing to be worn in or at the ear canal of a user; and a wire 8 connecting the first housing 4 and the second housing 6. The hearing device 2 comprises a primary set of microphones arranged in the first housing 4, the primary set of microphones including a primary first microphone 10 for provision of a primary first microphone input signal 10A, and a primary second microphone 12 for provision of a primary second microphone input signal 12A; a secondary microphone 14 arranged in the second housing 6 for provision of a secondary microphone input signal 14A; and a pinna restorer 16 for provision of a pinna output 18 based on a first pinna input 20 and a second pinna input 22. The first pinna input 20 is based on the primary first microphone input signal 10A and the second pinna input 22 is based on the primary second microphone input signal 12A.

The hearing device 2 comprises an input mixer 24 for provision of an input mixer output 26 based on the pinna output 18 and a secondary mixer input 28, wherein the secondary mixer input 28 is based on the secondary microphone input signal 14A; a processor 30 for processing the input mixer output 26 and providing an electrical output signal 32 based on the input mixer output 26; and a receiver 34 for converting the electrical output signal 32 to an audio output signal.

The hearing device 2 optionally comprises a feedback cancellation module 36 for provision of respective feedback cancellation signals 38, 40, 42 to respective primary first feedback canceller 44, primary second feedback canceller 46, and secondary feedback canceller 48. The primary first feedback canceller 44 applies feedback cancellation to the primary first microphone input signal 10A, the primary second feedback canceller 46 applies feedback cancellation to the primary second microphone input signal 12A, and the secondary feedback canceller 48 applies feedback cancellation to the secondary microphone input signal 14A. The output of secondary feedback canceller 48 is fed to secondary filter 50 for provision of the secondary mixer input 28 being fed to the input mixer 24 and the pinna restorer 16.

Figure 2:
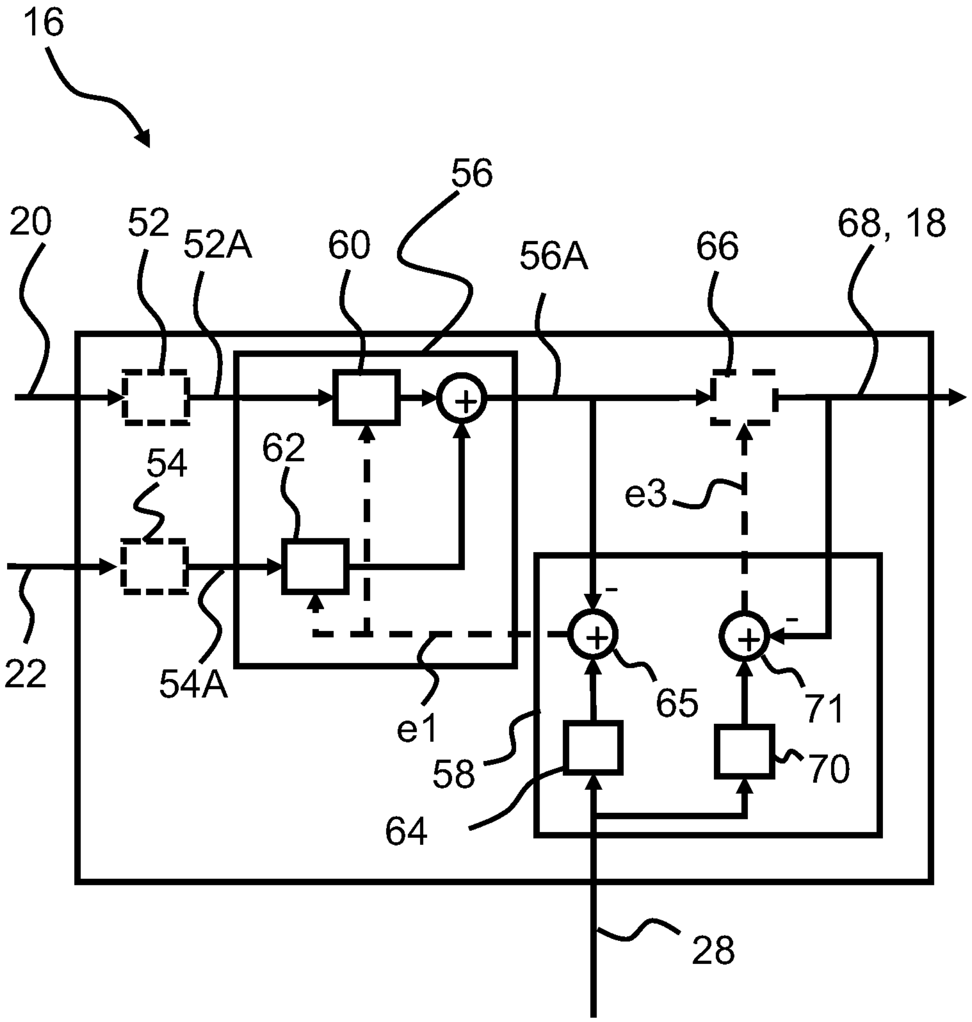
FIG. 2 schematically illustrates an exemplary pinna restorer of a hearing device, FIG. 3 schematically illustrates an exemplary pinna restorer of a hearing device, FIG. 4 schematically illustrates an exemplary pinna restorer of a hearing device, FIG. 5 schematically illustrates an exemplary input mixer of a hearing device.

FIG. 2 shows an example pinna restorer 16. The pinna restorer 16 comprises a first filter 52 for provision of a first mixer input 52A based on the first pinna input 20, e.g. from primary first feedback canceller 44. The pinna restorer 16 comprises a second filter 54 for provision of a second mixer input 54A based on the second pinna input 22, e.g. from the primary second feedback canceller 46. The pinna restorer 16 comprises a first mixer 56 for provision of a first mixer output 56A based on the first mixer input 52A and the second mixer input 54A. The first mixer 56 comprises a pinna controller 58, a first pinna filter 60 for filtering the first mixer input 52A, and a second pinna filter 62 for filtering the second mixer input 54A, the pinna controller 58 configured to control one or both of the first pinna filter 60 and the second pinna filter 62 based on the secondary mixer input 28 and the first mixer output 56A. The pinna controller 58 may be configured to determine a first pinna control signal e1 optionally as illustrated being an error signal between the secondary mixer input 28 delayed with a first delay D1 in first delay unit 64 of pinna controller 58 and the first mixer output 56A. In other words, to determine a first pinna control signal e1 comprises applying a first delay D1 to the secondary mixer input 28. A first control adder 65 provides the first pinna control signal e1 as the difference between the output of first delay unit 64 (secondary mixer input delayed with first delay D1) and the first mixer output 56A. The first pinna filter and/or the second pinna filter are adapted according to the first pinna control signal.

The pinna restorer 16 optionally comprises a third pinna filter 66 for provision of a first pinna output 68 based on the first mixer output 56A from the first mixer 56, and wherein the pinna output 18 is based on the first pinna output 68. As illustrated in FIG. 2, the first pinna output 68 may form or constitute the pinna output 18. The pinna controller 58 may be configured to control the third pinna filter 66 based on the secondary mixer input 28 and the first pinna output 68/pinna output 18. For example, the pinna controller 58 may be configured to determine a third pinna control signal e3 optionally as illustrated being an error signal between the secondary mixer input 28 delayed with a third delay D3 in third delay unit 70 of pinna controller 58 and the first pinna output 68. In other words, to determine a third pinna control signal e3 comprises applying a third delay D3 to the secondary mixer input 28. A third control adder 71 provides the third pinna control signal e3 as the difference between the output of third delay unit 70 (secondary mixer input delayed with third delay D3) and the first pinna output 68/pinna output 18. The third pinna filter is adapted according to the third pinna control signal.

FIG. 3 shows an example pinna restorer 16A. The pinna restorer 16A comprises a first filter 52 for provision of a first mixer input 52A based on the first pinna input 20, e.g. from primary first feedback canceller 44. The pinna restorer 16 comprises a second filter 54 for provision of a second mixer input 54A based on the second pinna input 22, e.g. from the primary second feedback canceller 46. The pinna restorer 16 comprises a first mixer 56 for provision of a first mixer output 56A based on the first mixer input 52A and the second mixer input 54A. The first mixer 56 comprises a pinna controller 58, a first pinna filter 60 for filtering the first mixer input 52A, and a second pinna filter 62 for filtering the second mixer input 54A, the pinna controller 58 configured to control one or both of the first pinna filter 60 and the second pinna filter 62 based on the secondary mixer input 28 and the first mixer output 56A. The pinna controller 58 may be configured to determine a first pinna control signal e1 optionally as illustrated being an error signal between the secondary mixer input 28 delayed with a first delay D1 in first delay unit 64 of pinna controller 58 and the first mixer output 56A. In other words, to determine a first pinna control signal e1 comprises applying a first delay D1 to the secondary mixer input 28. A first control adder 65 provides the first pinna control signal e1 as the difference between the output of first delay unit 64 (secondary mixer input delayed with first delay D1) and the first mixer output 56A. The first pinna filter and/or the second pinna filter are adapted according to the first pinna control signal.

The pinna restorer 16A optionally comprises a third pinna filter 66 being a fixed filter for provision of a first pinna output 68 based on the first mixer output 56A from the first mixer 56, and wherein the pinna output 18 is based on the first pinna output 68. The filter coefficients of the third pinna filter may be set during fitting, i.e. not adapted during normal use of the hearing device. As illustrated in FIG. 3, the first pinna output 68 may form or constitute the pinna output 18.

Figure 4:
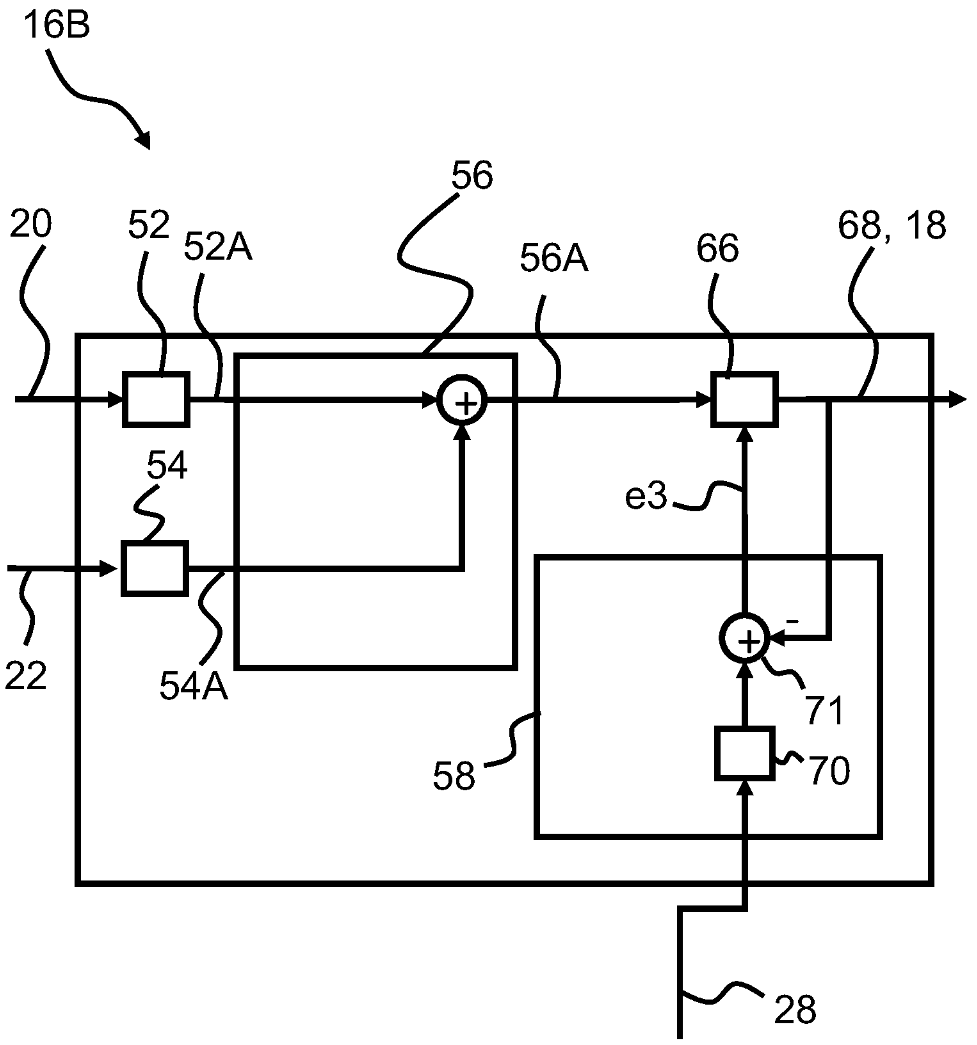

FIG. 4 shows an example pinna restorer 16B. The pinna restorer 16B comprises a first filter 52 for provision of a first mixer input 52A based on the first pinna input 20, e.g. from primary first feedback canceller 44. The pinna restorer 16B comprises a second filter 54 for provision of a second mixer input 54A based on the second pinna input 22, e.g. from the primary second feedback canceller 46. The pinna restorer 16A comprises a first mixer 56 for provision of a first mixer output 56A based on the first mixer input 52A and the second mixer input 54A. The first input filter 52 and the second input filter 54 may provide at least part of a fixed pinna restoration.

The pinna restorer 16B comprises a third pinna filter 66 for provision of a first pinna output 68 based on the first mixer output 56A from the first mixer 56, and wherein the pinna output 18 is based on the first pinna output 68. As illustrated in FIG. 2, the first pinna output 68 may form or constitute the pinna output 18. The pinna controller 58 may be configured to control the third pinna filter 66 based on the secondary mixer input 28 and the first pinna output 68/pinna output 18. The first mixer 56 comprises a pinna controller 58 configured to determine a third pinna control signal e3 optionally as illustrated being an error signal between the secondary mixer input 28 delayed with a third delay D3 in third delay unit 70 of pinna controller 58 and the first pinna output 68. In other words, to determine a third pinna control signal e3 comprises applying a third delay D3 to the secondary mixer input 28. A third control adder 71 provides the third pinna control signal e3 as the difference between the output of third delay unit 70 (secondary mixer input delayed with third delay D3) and the first pinna output 68/pinna output 18. The third pinna filter is adapted according to the third pinna control signal.

Figure 5:
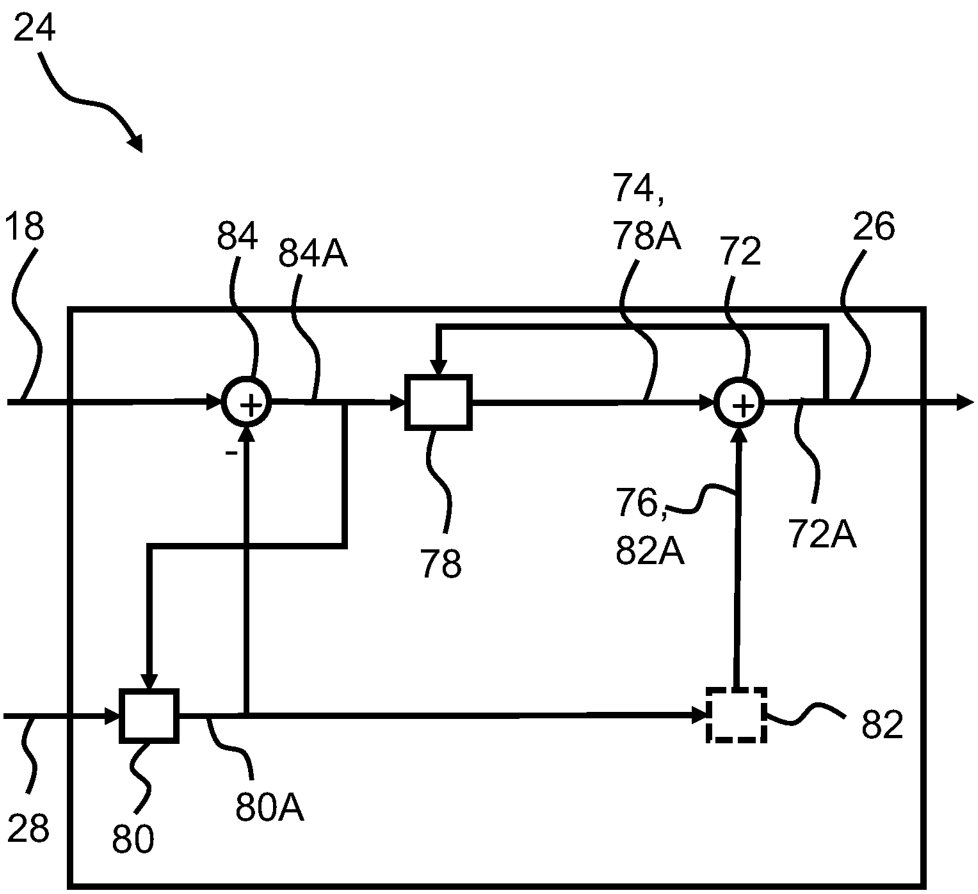

FIG. 5 shows an exemplary input mixer 24. The input mixer 24 comprises a first input adder 72 for provision of the input mixer output 26 based on a first main input 74 and a second main input 76, wherein the first main input 74 is based on the pinna output 18 and the second main input 76 is based on the secondary mixer input 28. The input mixer 24 comprises a first input filter 78 for provision of the first main input 74 being a first output 78A of the first input filter 78. The input mixer 24 comprises a second input filter 80 for provision of the second main input 76 based on a second output 80A of the second input filter 80. As illustrated in FIG. 3, the second output 80A is optionally filtered by third input filter 82 for provision of a third output 82A forming the second main input 76 that is fed to the first input adder 72. The input mixer 24 comprises a second input adder 84 for provision of a second adder output 84A forming the input to the first input filter 78 by determining the difference between the pinna output 18 and the second output 80A. The second adder output 84A of the second input adder 84 is fed to the second input filter 80 for controlling the second input filter 80 being an adaptive filter. In other words, the input mixer 24 is configured to control the second input filter 80 based on the pinna input 18 and/or the second output 80A of the second input filter 80.

Further, the first adder output 72A/input mixer output 26 is optionally fed to the first input filter 78 for controlling the first input filter 78 being an adaptive filter. In other words, the input mixer 24 is configured to control the first input filter 76 based on the input mixer output 26. In one or more example hearing devices, the first input filter may be frozen, e.g. when or while one or more of the first pinna filter, the second pinna filter, and the third pinna filter are adapted.

Figure 6:
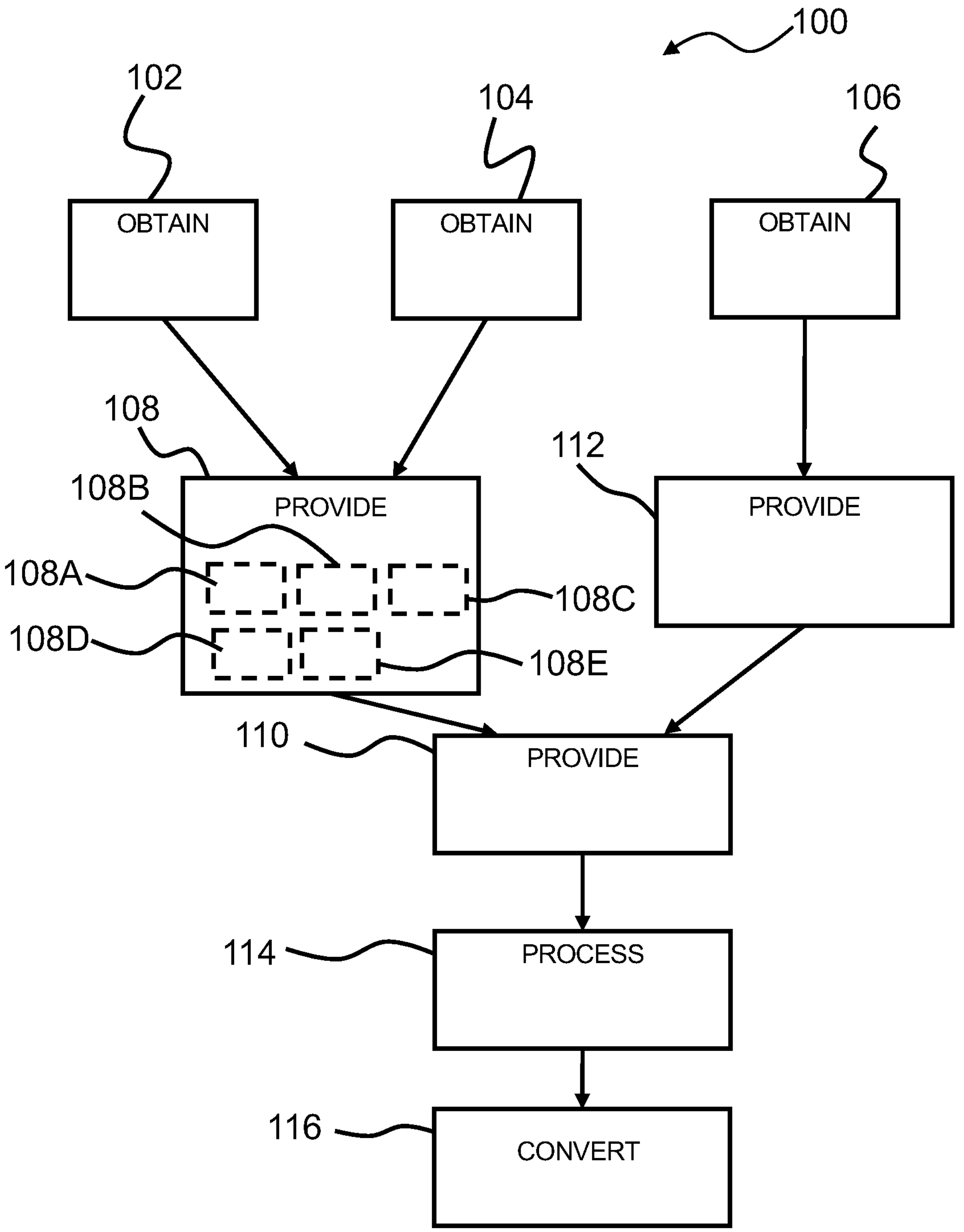
FIG. 6 is a flow diagram of an exemplary method according to the disclosure.

FIG. 6 is a flow diagram of an exemplary method of operating a hearing device. The hearing device comprises a first housing configured as a behind-the-ear housing to be worn behind the pinna of a user; a second housing configured as an earpiece housing to be worn in or at the ear canal of a user; a wire connecting the first housing and the second housing; a primary set of microphones arranged in the first housing, the primary set of microphones including a primary first microphone and a primary second microphone; a secondary microphone arranged in the second housing; a pinna restorer; an input mixer; a processor; and a receiver. The method 100 comprises obtaining 102 a primary first microphone input signal with the primary first microphone; obtaining 104 a primary second microphone input signal with the primary second microphone; obtaining 106 a secondary microphone input signal with the secondary microphone; and providing 108 a pinna output based on a first pinna input and a second pinna input, wherein the first pinna input is based on the primary first microphone input signal and the second pinna input is based on the primary second microphone input signal, wherein providing 108 a pinna output comprises providing 108A a first mixer input based on the first pinna input, providing 1088 a second mixer input based on the second pinna input, and providing 108C a first mixer output based on the first mixer input and the second mixer input.

The method 100 comprises providing 110 an input mixer output based on the pinna output and a secondary mixer input, wherein the secondary mixer input is based on the secondary microphone input signal, i.e. the method optionally comprises providing 112 the secondary mixer input based on the secondary microphone input signal. The method comprises processing 114 the input mixer output for provision of an electrical output signal; and converting 116 the electrical output signal to an audio output signal. In the method 100, providing 108 a pinna output comprises controlling 108D one or both of a first pinna filter and a second pinna filter of the pinna restorer based on the secondary mixer input, and optionally filtering 108E, e.g. with third pinna filter, the first mixer output for provision of a first pinna output, and wherein the pinna output is based on the first pinna output.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that the figures comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. Accordingly, the specification and drawings are to be regarded in an illustrative rather than restrictive sense. The claimed invention is intended to cover all alternatives, modifications, and equivalents.

LIST OF REFERENCES

2, 2A, 2B, 2C hearing device
4 first housing
6 second housing
8 wire
10 primary first microphone
10A primary first microphone input signal
12 primary second microphone
12A primary second microphone input signal
14 secondary microphone
14A secondary microphone input signal
16, 16A, 16B pinna restorer, pinna restoration module
18 pinna output
20 first pinna input
22 second pinna input
24 input mixer
26 input mixer output, IMO
28 secondary mixer input, SMI
30 processor
32 electrical output signal
34 receiver
36 feedback cancellation module
38 primary first feedback cancellation signal
40 primary second feedback cancellation signal
42 secondary feedback cancellation signal
44 primary first feedback canceller
46 primary second feedback canceller
48 secondary feedback canceller
50 secondary filter
52 first filter
52A first mixer input
54 second filter
54A second mixer input
56 first mixer
56A first mixer output, FMO
58 pinna controller
60 first pinna filter
62 second pinna filter
64 first delay unit, first delay element
65 first control adder
66 third pinna filter
68 first pinna output, FPO
70 third delay unit, third delay element
71 third control adder
72 first input adder
74 first main input
76 second main input
78 first input filter
78A first output
80 second input filter
80A second output, SO
82 third input filter
82A third output
84 second input adder
84A second adder output
100 method of operating a hearing device
102 obtaining a primary first microphone input signal
104 obtaining a primary second microphone input signal
106 obtaining a secondary microphone input signal
108 providing a pinna output based on a first pinna input and a second pinna input
108A providing a first mixer input based on the first pinna input
108A providing a second mixer input based on the second pinna input
108C providing a first mixer output based on the first mixer input and the second mixer input
108D controlling one or both of a first pinna filter and a second pinna filter of the pinna restorer
108E filtering 108E the first mixer output for provision of a first pinna output
110 providing an input mixer output based on the pinna output and a secondary mixer input
112 providing the secondary mixer input based on the secondary microphone input signal
114 processing the mixer output for provision of an electrical output signal
116 converting the electrical output signal to an audio output signal
e1 first pinna control signal
e3 third pinna control signal

The invention claimed is:

1. A hearing device comprising:

a behind-the-ear housing configured to be worn behind a pinna of a user;

an earpiece housing configured to be worn in or at an ear canal of the user;

a wire couped between the behind-the-ear housing and the earpiece housing;

a set of primary microphones in the behind-the-ear housing, the set of primary microphones including a primary first microphone for provision of a primary first microphone input signal, and a primary second microphone for provision of a primary second microphone input signal;

a secondary microphone in the earpiece housing for provision of a secondary microphone input signal;

a pinna restorer for provision of a pinna output based on a first pinna input and a second pinna input, wherein the first pinna input is based on the primary first microphone input signal, and wherein the second pinna input is based on the primary second microphone input signal, the pinna restorer comprising:

a first filter for provision of a first mixer input based on the first pinna input, a second filter for provision of a second mixer input based on the second pinna input, a first mixer for provision of a first mixer output based on the first mixer input and the second mixer input, wherein the pinna output is based on the first mixer output, and a pinna controller; and an input mixer for provision of an input mixer output based on the pinna output and a secondary mixer input, wherein the secondary mixer input is based on the secondary microphone input signal, and wherein the input mixer comprises a first input filter for provision of a first main input, and wherein the input mixer comprises a second input filter for provision of a second main input.

2. The hearing device according to claim 1, wherein the pinna restorer further comprises a third pinna filter for provision of a first pinna output based on the first mixer output from the first mixer, and wherein the pinna output is based on the first pinna output.

3. The hearing device according to claim 2, wherein the pinna controller is configured to control the third pinna filter based on the first pinna output.

4. The hearing device according to claim 1, wherein the pinna controller is configured to determine a first pinna control signal by applying a first delay to the secondary mixer input.

5. The hearing device according to claim 1, wherein the first mixer comprises a first pinna filter for filtering the first mixer input, and a second pinna filter for filtering the second mixer input.

6. The hearing device according to claim 5, wherein the pinna controller is configured to control the first pinna filter and/or the second pinna filter based on the secondary mixer input.

7. The hearing device according to claim 5, wherein the pinna controller is configured to control the first pinna filter and/or the second pinna filter based on the first mixer output.

8. The hearing device according to claim 1, wherein the pinna restorer further comprises a third pinna filter, and wherein the pinna controller is configured to control the third pinna filter based on the secondary mixer input.

9. The hearing device according to claim 8, wherein the pinna controller is configured to determine a control signal by applying a delay to the secondary mixer input, and to control the third pinna filter based on the control signal.

10. The hearing device according to claim 1, further comprising a feedback canceller configured to apply feedback cancellation to one or more of the primary first microphone input signal, the primary second microphone input signal, and the secondary microphone input signal.

11. A hearing device comprising:

a behind-the-ear housing configured to be worn behind a pinna of a user;

an earpiece housing configured to be worn in or at an ear canal of the user;

a wire couped between the behind-the-ear housing and the earpiece housing;

a set of primary microphones in the behind-the-ear housing, the set of primary microphones including a primary first microphone for provision of a primary first microphone input signal, and a primary second microphone for provision of a primary second microphone input signal;

a secondary microphone in the earpiece housing for provision of a secondary microphone input signal;

a pinna restorer for provision of a pinna output based on a first pinna input and a second pinna input, wherein the first pinna input is based on the primary first microphone input signal, and wherein the second pinna input is based on the primary second microphone input signal, the pinna restorer comprising:

a first filter for provision of a first mixer input based on the first pinna input, a second filter for provision of a second mixer input based on the second pinna input, a first mixer for provision of a first mixer output based on the first mixer input and the second mixer input, wherein the pinna output is based on the first mixer output, and a pinna controller; and an input mixer for provision of an input mixer output based on the pinna output and a secondary mixer input, wherein the secondary mixer input is based on the secondary microphone input signal;

wherein the input mixer comprises a first input adder for provision of the input mixer output based on a first main input and a second main input, wherein the first main input is based on the pinna output and the second main input is based on the secondary mixer input;

wherein the input mixer comprises a first input filter for provision of the first main input, and wherein the input mixer comprises a second input filter for provision of the second main input.

12. The hearing device according to claim 11, wherein the first input filter is controllable based on the input mixer output.

13. The hearing device according to claim 11, wherein the second input filter is controllable based on the pinna output and/or an output of the second input filter.

14. The hearing device according to claim 1, further comprising:

a processor configured to obtain the input mixer output, and provide an electrical output signal based on the input mixer output; and a receiver configured to provide an audio output signal based on the electrical output signal.

15. A method performed by a hearing device comprising a behind-the-ear housing to be worn behind the pinna of a user; an earpiece housing to be worn in or at the ear canal of a user; a wire coupled between the behind-the-ear housing and the earpiece housing; a set of primary microphones in the behind-the-ear housing, the set of primary microphones including a primary first microphone and a primary second microphone; a secondary microphone in the earpiece housing; a pinna restorer, and an input mixer, the method comprising:

providing a primary first microphone input signal by the primary first microphone;

providing a primary second microphone input signal by the primary second microphone;

providing a secondary microphone input signal by the secondary microphone;

determining a pinna output by the pinna restorer based on a first pinna input and a second pinna input, wherein the first pinna input is based on the primary first microphone input signal, and wherein the second pinna input is based on the primary second microphone input signal, wherein the act of determining the pinna output comprises:

obtaining a first mixer input based on the first pinna input, obtaining a second mixer input based on the second pinna input, and determining a first mixer output by a first mixer based on the first mixer input and the second mixer input, wherein the pinna output is based on the first mixer output; and providing an input mixer output by the input mixer based on the pinna output and a secondary mixer input, wherein the secondary mixer input is based on the secondary microphone input signal, wherein the input mixer comprises a first input filter for provision of a first main input, and wherein the input mixer comprises a second input filter for provision of a second main input.

16. The method according to claim 15, further comprising:

processing the input mixer output for provision of an electrical output signal; and providing an audio output signal based on the electrical output signal.

17. The method according to claim 15, further comprising filtering the first mixer output for provision of a first pinna output, wherein the pinna output is based on the first pinna output.

18. The method according to claim 15, further comprising controlling a first pinna filter and/or a second pinna filter of the pinna restorer based on the secondary mixer input.

* * * * *